A. F. Ledbetter,
Apple Cutter.
N° 23,095. Patented Mar. 1, 1859.
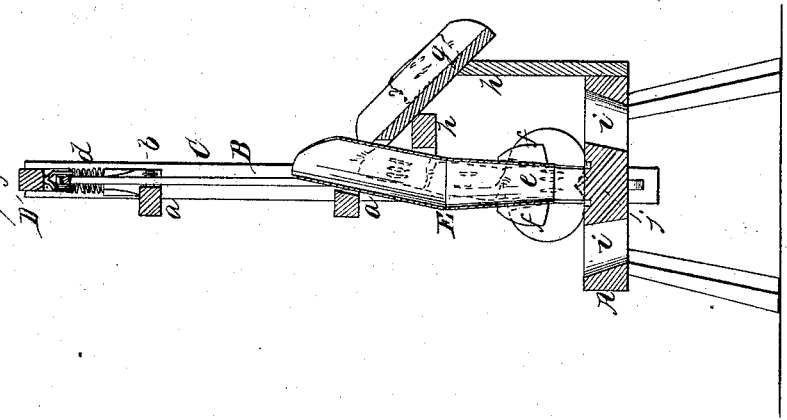
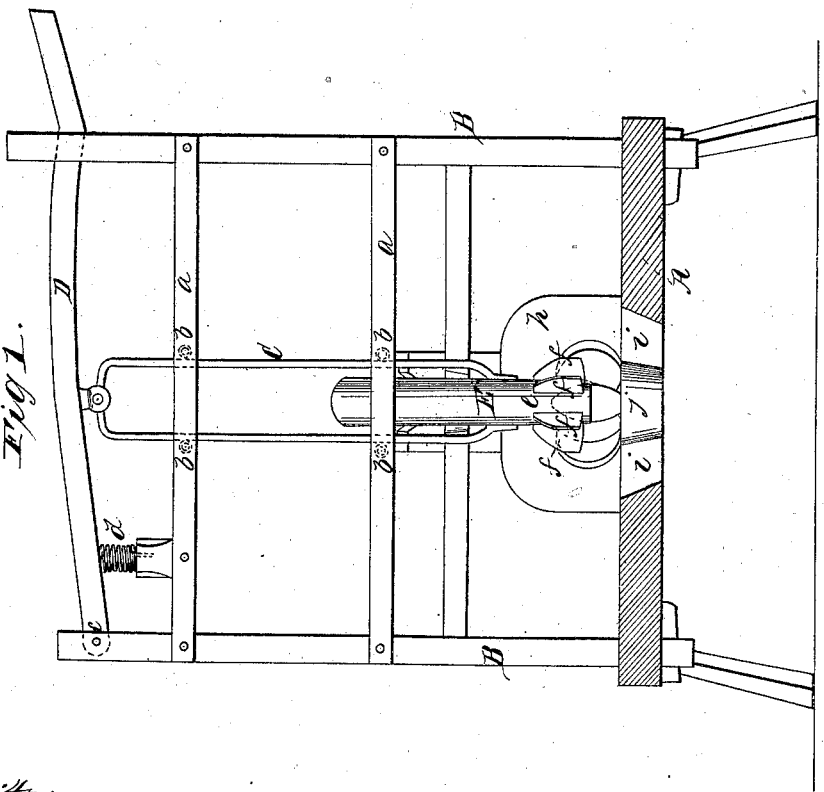
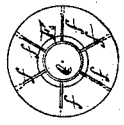
Witnesses.
Enoch Stephens
Henry Ledbetter
Inventor.
A. F. Ledbetter.

UNITED STATES PATENT OFFICE.

A. F. LEDBETTER, OF WESTMINSTER, NORTH CAROLINA.

APPLE CUTTING AND CORING MACHINE.

Specification of Letters Patent No. 23,095, dated March 1, 1859.

*To all whom it may concern:*

Be it known that I, A. F. LEDBETTER, of Westminster, in the county of Guilford and State of North Carolina, have invented a new and Improved Machine for Cutting or Slicing and Coring Apples; and I do hereby declare that the following is a full, clear, and exact description of the same, reference being had to the annexed drawings, making a part of this specification, in which—

Figure 1, is a front elevation of my invention partly in section. Fig. 2, a side central section of do. Fig. 3, a detached inverted plan of the cutter.

Similar letters of reference indicate corresponding parts in the several figures.

This invention consists in the employment or use of a cutter formed of a tube with radial knives attached. Said cutter being secured to the lower end of a vertical frame or gate which works directly over a bench in which a circular bed or support encompassed by an annular opening is formed, the whole being arranged as hereinafter fully shown and described, whereby the desired work, to wit, the slicing and coring of apples may be performed very expeditiously and with the greatest facility, the slices and cores being discharged separately from the machine.

To enable those skilled in the art to fully understand and construct my invention I will proceed to describe it.

A, represents a bench supported at a suitable height in any proper way, and B, B, are two uprights that are attached to the bench A, one near each end, said uprights being connected by traverse bars $a$.

C, is a frame or gate which is fitted between guide rollers $b$, attached to the traverse bars $a$, and allowed to work freely up and down between them. The upper end of this frame or gate C, is attached to a lever D, one end of which is secured to one of the uprights B, by a fulcrum pin $c$, said lever having a spring $d$, bearing against its under side, which spring has a tendency to keep the lever D, elevated and the frame or gate C, raised. See more particularly Fig. 1.

E, represents a cutter which is formed of a tube $e$, the lower end of which has a cutting edge. This tube has a series of radial knives $f$, attached to it near its lower end. Six knives are shown in Fig. 3, but more or less may be used, corresponding to the number of slices into which the apples are to be cut. The upper end of the tube $e$, is bent or inclined, as shown clearly in Fig. 2, and an inclined spout $g$, is attached to proper supports $h$, in such a way, that its upper end will be quite near the upper bent or inclined portion of the tube $e$. See Fig. 2.

In the bench A, an annular opening $i$, is made, and a circular support or bed $j$, is left or formed at the center to support the apple to be cut. See both figures.

The operation will be readily seen:—The apple to be cut and cored, is placed on the bed $j$, which is directly under the cutter E. The cutter E, is made to descend in consequence of the operator pressing down the lever D, and the tube $e$, cuts out the core of the apple while the knives $f$, slice the other portion the slices falling, through the opening $i$, into any proper receptacle prepared to receive them, while the cores are by the descent of the cutter forced up through the tube $e$, each core as it is being cut forcing the one that was cut previously upward within the tube, the cores as they pass out of the upper end of the tube $e$, falling into spout $g$, the upper end of the tube $e$, being inclined for such purpose. The cutter it will be understood is raised by the action of the spring $d$.

The frame C, may be constructed of a metal rod or bar, the cutter of course would be of metal. The bench and uprights may be of iron, although a light casting might answer.

I do not claim the cutter E, separately, for such device or its equivalent has been previously used; but,

Having thus described my invention, what I do claim as new and desire to secure by Letters Patent, is,

The cutter E, attached to the reciprocating frame C, in connection with the annular opening $i$, in the bench A, and with or without the spout $g$, the parts being arranged to operate as and for the purpose set forth.

A. F. LEDBETTER.

Witnesses:
ENOCH STEPHENS,
HENRY LEDBETTER.